(12) United States Patent
Nakasato et al.

(10) Patent No.: US 11,962,425 B2
(45) Date of Patent: Apr. 16, 2024

(54) COMMUNICATION SYSTEM

(71) Applicant: FANUC CORPORATION, Yamanashi (JP)

(72) Inventors: Teruki Nakasato, Yamanashi (JP); Tomomasa Nakama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/905,342

(22) PCT Filed: Mar. 4, 2021

(86) PCT No.: PCT/JP2021/008491
§ 371 (c)(1),
(2) Date: Aug. 31, 2022

(87) PCT Pub. No.: WO2021/177412
PCT Pub. Date: Sep. 10, 2021

(65) Prior Publication Data
US 2023/0098515 A1 Mar. 30, 2023

(30) Foreign Application Priority Data
Mar. 6, 2020 (JP) .................. 2020-039262

(51) Int. Cl.
*G01R 31/28* (2006.01)
*H04L 1/00* (2006.01)
(Continued)

(52) U.S. Cl.
CPC ............... *H04L 1/22* (2013.01); *H04L 1/009* (2013.01); *H04L 1/24* (2013.01)

(58) Field of Classification Search
CPC ............. H04L 1/22; H04L 1/009; H04L 1/24
See application file for complete search history.

(56) References Cited

U.S. PATENT DOCUMENTS

| 2010/0250805 | A1* | 9/2010 | Cohen | G06F 13/4004 |
| | | | | 710/110 |
| 2015/0177725 | A1 | 6/2015 | Miura | |
| 2020/0076713 | A1* | 3/2020 | Meyer | H04L 43/06 |

FOREIGN PATENT DOCUMENTS

| CN | 108540263 A | 9/2018 |
| EP | 4220423 A1 * | 8/2023 |
| (Continued) | | |

OTHER PUBLICATIONS

International Search Report issued in PCT/JP2021/008491; dated May 11, 2021.

*Primary Examiner* — Samir W Rizk
(74) *Attorney, Agent, or Firm* — Studebaker & Brackett PC

(57) ABSTRACT

A master communication device of this communication system comprises: a generation unit that generates transmission data consisting of consecutive data to all slave communication devices following one header; and a transmission unit that transmits the transmission data generated by the generation unit at the fastest cycle, among communication cycles requested by the plurality of slave communication devices. Each of the plurality of slave communication devices of the communication system comprises: a storage unit that adds information indicating reliability to data received from the master communication device and stores the same; a comparison unit that compares the reliability of subsequently received data and the reliability of the data stored in the storage unit; and a selection unit that selects the data stored in the storage unit if the reliability of the data stored in the storage unit is higher than the reliability of the data subsequently received by the comparison unit.

5 Claims, 6 Drawing Sheets

(51) Int. Cl.
*H04L 1/22* (2006.01)
*H04L 1/24* (2006.01)

(56) References Cited

FOREIGN PATENT DOCUMENTS

| | | |
|---|---|---|
| JP | 2000-252892 A | 9/2000 |
| JP | 2002-171176 A | 6/2002 |
| JP | 2006-094302 A | 4/2006 |
| JP | 2015-125456 A | 7/2015 |

* cited by examiner

COMMUNICATION SYSTEM

TECHNICAL FIELD

The present invention relates to a communication system in which a plurality of slave communication devices are connected in a daisy chain from a master communication device.

BACKGROUND ART

Conventionally, in such a type of communication system, a master communication device communicates with each of slave communication devices at a fixed cycle. In this case, in order to improve communication efficiency, data to be exchanged between the master communication device and the slave communication devices has a fixed structure in which one header is set and data for all the slave communication devices is linked in a subsequent stage of the header.

In the communication system, the master communication device executes transfer processing by attaching an ECC (Error-Correcting Code) to the data for each slave communication device, thereby improving reliability of the data.

Patent Document 1: Japanese Unexamined Patent Application, Publication No. 2006-94302

Patent Document 2: Japanese Unexamined Patent Application, Publication No. 2002-171176

DISCLOSURE OF THE INVENTION

Problems to be Solved by the Invention

FIG. 5 is a block diagram illustrating data transmission/reception processing of a conventional communication system, and FIG. 6 is a diagram illustrating a state of received data in the communication system in which the master communication device and slave communication devices shown in FIG. 5 are connected in a daisy chain.

In FIG. 5, a slave communication device (Slave #1), a slave communication device (Slave #2), and a slave communication device (Slave #3) are connected in a daisy chain to a master communication device (Master).

Here, a fastest cycle of the master communication device (Master) is set to 50 µs, a cycle for the slave communication device (Slave #1) to receive data is set to 100 µs, a cycle for the slave communication device (Slave #2) to receive data is set to 200 µs, and a cycle for the slave communication device (Slave #3) to receive data is set to 50 µs.

Here, a case is assumed in which the master communication device (Master) uses one header (Header) to link different data for respective slave communication devices and transmits the data divided into four parts by way of four times of transmission. In other words, at a timing other than a timing at which the data for each of the slave communication devices should be received, the master communication device (Master) transmits data including data that is going to be discarded, to each of the slave communication devices.

In FIG. 6, upon lapse of the time from 0 to 50 µs, among the slave communication device (Slave #1), the slave communication device (Slave #2), and the slave communication device (Slave #3), only the slave communication device (Slave #3) normally receives data, and the slave communication device (Slave #1) and the slave communication device (Slave #2) are at a timing different from the data reception cycle, and thus discard the received data.

Next, upon lapse of the time from 50 to 100 µs, since the slave communication device (Slave #1) is at a timing for receiving data, an error occurs in which data is received but cannot be repaired, and since the slave communication device (Slave #2) is not at a timing for receiving data, the received data is discarded. Then, upon lapse of the time from 100 to 150 µs, since neither the slave communication device (Slave #1) nor the slave communication device (Slave #2) is at a timing for receiving data, even when the data is normally received, the data is discarded. On the other hand, the slave communication device (Slave #3) normally receives data.

Then, upon lapse of the time from 150 to 200 µs, since the slave communication device (Slave #1) and the slave communication device (Slave #2) are at a timing for receiving data, when an error occurs in which the data is received but cannot be repaired, the slave communication device (Slave #1) and the slave communication device (Slave #2) cannot consequently avoid the error even though the data was normally received at a previous timing. On the other hand, the slave communication device (Slave #3) normally receives data.

As can be seen, even in a case where all the slave communication devices request and prepare data at different timings, the master communication device needs to transmit data to all the slave communication devices at the fastest cycle. Therefore, each of the slave communication devices is controlled to discard the data even when it normally receives the data at a timing different from a timing at which the data should be received.

Further, in a case of correcting the received data using an ECC in the communication system, when there is an ECC error in data received by the slave communication device at the timing at which the data should be received, the slave communication device consequently processes the received data as an error.

It is desirable for such a communication system to be capable of performing data communication that efficiently utilizes data received normally or in a correctable manner at a timing different from a timing at which each of slave communication devices should receive the data.

Means for Solving the Problems

The present disclosure provides a communication system in which a plurality of slave communication devices are connected in a daisy chain to a master communication device, the master communication device including: a generation unit that generates transmission data including one header and consecutive data for all slave communication devices, the consecutive data following the one header; a transmission unit that transmits the transmission data generated by the generation unit at a fastest cycle among communication cycles requested by the plurality of slave communication devices, the plurality of slave communication devices including: a storage unit that attaches information indicating reliability to data received from the master communication device and stores the same; a comparison unit that compares reliability of data received later with the reliability of the data stored in the storage unit; and a selection unit that selects the data stored in the storage unit in a case where the reliability of the data stored in the storage unit is higher than the reliability of the data received later by the comparison unit.

Effects of the Invention

According to an aspect, it is possible to perform data communication that efficiently utilizes the data received normally or in a correctable manner at the timing different from the timing at which each of the slave communication devices should receive the data.

PREFERRED MODE FOR CARRYING OUT THE INVENTION

Embodiments of the present disclosure will be described below. First, a configuration of a communication system will be described, in which a plurality of slave communication devices are connected in a daisy chain from a master communication device, with reference to the drawings.

Figure 1:
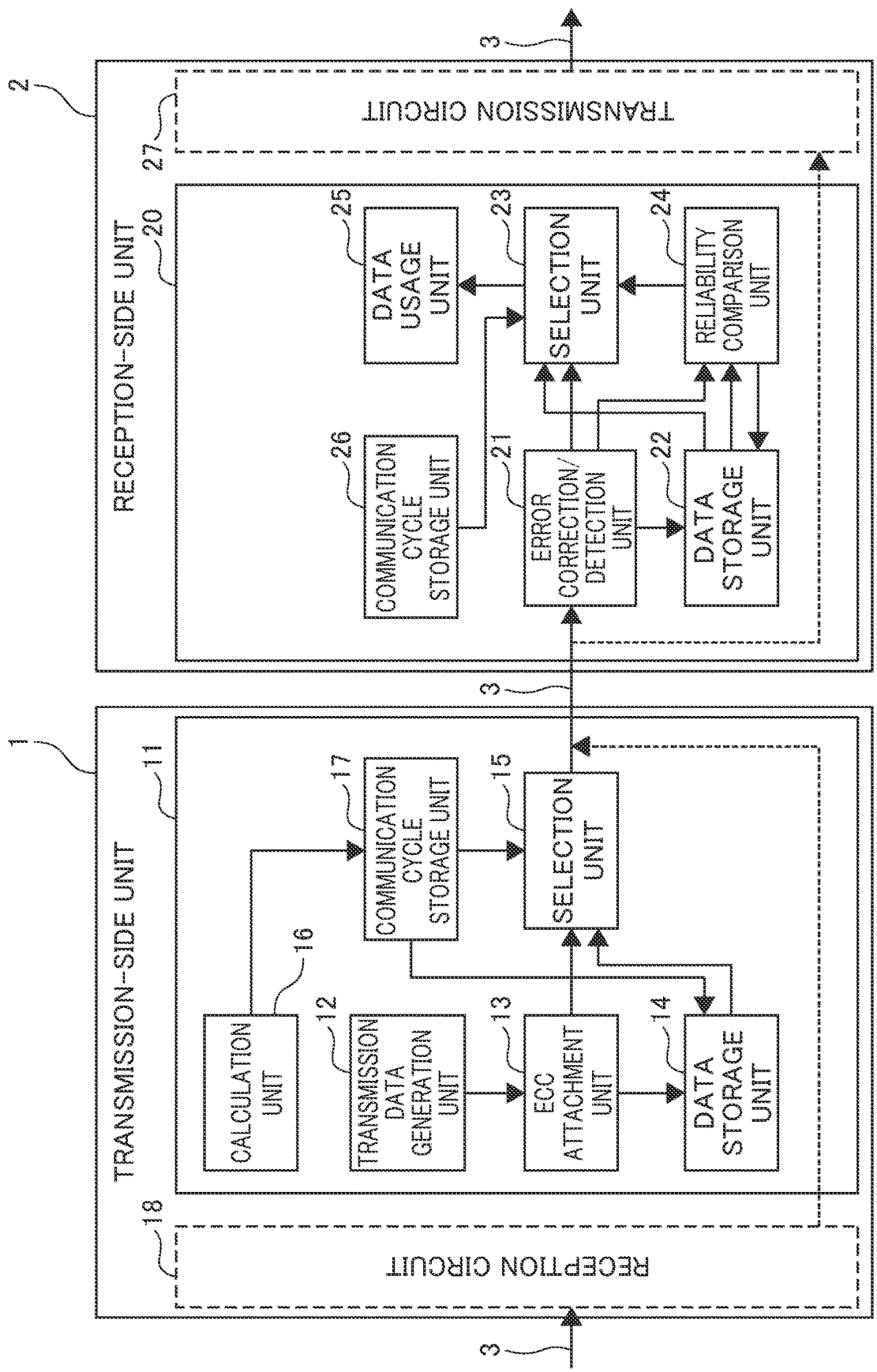
FIG. 1 is a block diagram illustrating a configuration of a communication system showing the present embodiment.

FIG. 1 is a block diagram illustrating a configuration of a communication system showing the present embodiment. This example shows a communication system in which a transmission-side unit 1 and a reception-side unit 2 communicate with each other via a predetermined communication path 3, while omitting an upstream side from the transmission-side unit 1 and a downstream side of the reception-side unit 2 are omitted.

In this example, the transmission-side unit 1 as a master communication device generates transmission data, and repeatedly transmits the same generated transmission data to the reception-side unit 2 as a slave communication device. A plurality of reception-side units 2 (not shown) are also connected to a subsequent stage of the reception-side unit 2.

A transmission circuit 11 of the transmission-side unit 1 shown in FIG. 1 is constituted by a transmission data generation unit 12, an ECC attachment unit 13, a data storage unit 14, a selection unit 15, a calculation unit 16, and a communication cycle storage unit 17.

The transmission data generation unit 12 as a generation unit generates transmission data including consecutive data for all slave communication devices following one header.

Here, in terms of the transmission data, there are no particular restrictions on a connection sequence and a data arrangement sequence of all of the slave communication devices.

The ECC attachment unit 13 attaches an error correction code ECC to data for each of the slave communication devices, and causes one to be stored in the data storage unit 14, the ECC being used to correct a communication error of the transmission data including consecutive data to all slave communication devices following one header, the transmission data being generated by the transmission data generation unit 12. A reception circuit 18 receives the ECC-attached transmission data transmitted via the communication path 3.

The communication cycle storage unit 17 stores the fastest cycle, at which the transmission data is transmitted to the reception-side unit 2 in the subsequent stage, for example, 50 µs, and the number of times of transmission of transmission data calculated by the calculation unit 16 to be described below. The selection unit 15 as a transmission unit selects the transmission data stored in the data storage unit 14 or the transmission data output from the ECC attachment unit 13, and transmits the selected transmission data to the reception-side unit 2 via the communication path 3.

Here, as will be described below, the selection unit 15 transmits the transmission data generated by the transmission data generation unit 12 to the plurality of reception-side units 2 connected to the subsequent stage at the fastest cycle (50 µs). The calculation unit 16 calculates the fastest cycle for transmission data to be transferred on the communication path 3 and the number of times of transmission of the transmission data, from the fastest cycle and cycles at which the data is transferred to the plurality of slave communication devices.

A reception circuit 20 of the reception-side unit 2 shown in FIG. 1 includes an error correction/detection unit 21, a data storage unit 22, a selection unit 23, a reliability comparison unit 24, a data usage unit 25, and a communication cycle storage unit 26.

The data storage unit 22 temporarily stores correctly corrected received data or correct received data among received data received via the communication path 3. In the present embodiment, the error correction/detection unit 21 as a determination unit divides and evaluates reliability of the received data received in three levels, and detects an error to determine whether the error is correctable or uncorrectable when the received data is stored in the data storage unit 22.

Specifically, the error correction/detection unit 21 evaluates whether the received data is correctable or uncorrectable based on the error correction code ECC and allows the data storage unit 22 to store the data attached with information indicating reliability (based on the correctability). In the present embodiment, an example of the information indicating the reliability divided into three levels includes any one of that there is no error (indicating that the reliability is high when the data is normally received), that there is an error, but the error has been corrected (indicating that the reliability is slightly low when the data received based on the ECC has been corrected), and that there is an error, and the error is uncorrectable (indicating that the reliability is low when the data received based on the ECC cannot be corrected).

Reference numeral 26 indicates the communication cycle storage unit which stores a cycle (any of 50 µs, 100 µs, 150 µs, and 200 µs) set in its own reception-side unit 2, the fastest cycle for data transmission and the like. The communication cycle storage unit is configured to store the transfer cycle of data to each of the slave communication devices and the fastest cycle for data transfer which are notified in advance by a setting command or the like from the master communication device, but is not limited thereto.

The reliability comparison unit 24 as a comparison unit selects any data having high reliability based on the reliability of data received from the error correction/detection unit 21, for example, in a second cycle (100 µs) and data output in a first cycle (50 µs) and stored in the data storage unit 22, and outputs it to the data usage unit 25.

The selection unit 23 selects data determined to have high reliability by the reliability comparison unit 24. The data usage unit 25 uses the data selected by the selection unit 23.

A transmission circuit 27 transmits the received data to the reception-side unit (not shown) in the subsequent stage.

In the present embodiment, cycles are different from each other at which the respective slave communication devices receive data, and the cycles are 50 μs, 100 μs, 150 μs, and 200 μs as an example.

For example, assuming that the communication system is applied to a system including a controller of a machine tool and the machine tool, the data usage unit 25 corresponds to an amplifier of the machine tool or the like, and each amplifier generates heat according to a torque thereof. For this reason, it is necessary to delay or advance a reception timing in order to prevent heat generation due to each amplifier, and thus it is necessary to adjust the cycles, at which the respective slave communication devices receive data, to 50 μs, 100 μs, 150 μs, and 200 μs.

Further, when the selection unit 15 as a transmission unit transmits the transmission data generated by the transmission data generation unit 12 to the plurality of reception-side units 2 connected to the subsequent stage at the fastest cycle (50 μs), the selection unit 15 transmits repeatedly the same data to a slave communication device (Slave #2), which receives data at a cycle (for example, 200 μs) longer than the fastest cycle (50 μs), at the fastest cycle.

[Data Communication Processing of Transmission-Side Unit 1]

Figure 2:
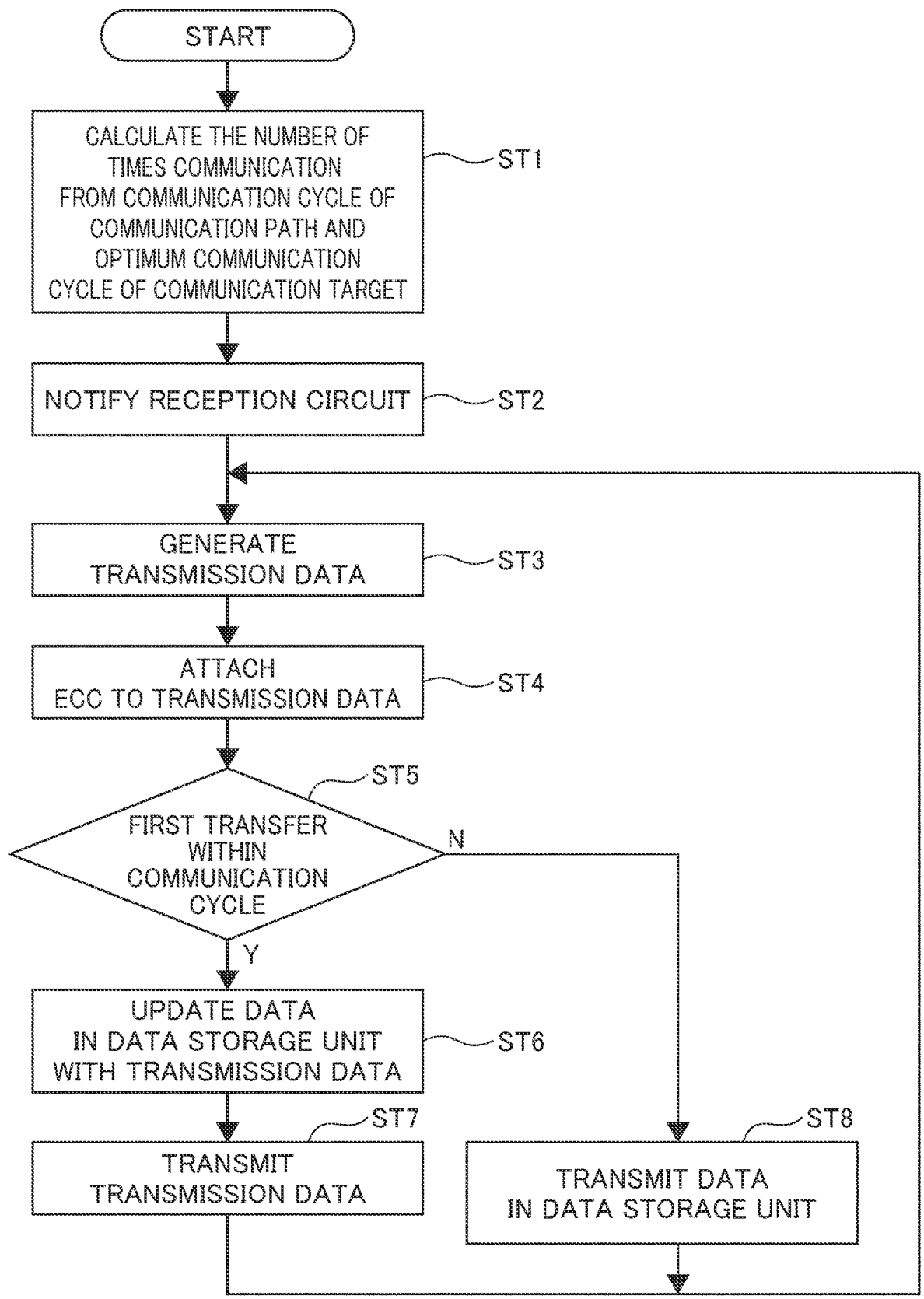
FIG. 2 is a flowchart illustrating data communication processing of the communication system showing the present embodiment.

FIG. 2 is a flowchart illustrating data communication processing of the communication system showing the present embodiment. ST1 to ST8 indicate respective Steps, and each of the Steps is realized in a manner that a CPU (not shown) constituting the transmission circuit 11 of the transmission-side unit 1 loads a control program stored in a ROM or the like on a RAM and executes the control program. Further, this data communication processing may be configured as a master communication device in which this processing by the software shown in the present embodiment is realized by a hardware circuit.

In ST1, when the fastest cycle of the master communication device (Master) is determined to be 50 μs with respect to a slave communication device (Slave #3) and a cycle of a slave communication device (Slave #1), a cycle of a slave communication device (Slave #2), and a cycle of a slave communication device (Slave #3) shown in FIG. 4 (to be described below) are set to 100 μs, 200 μs, and 50 μs, respectively, the calculation unit 16 calculates the number of times of transmission being two, four, and one by respectively dividing the cycles 100 μs, 200 μs, and 50 μs of the slave communication devices by the fastest cycle of 50 μs. Then, the communication cycle storage unit 17 stores the fastest cycle of 50 μs and the number of times of transmission being two, four, and one.

Next, in ST2, the transmission circuit 11 notifies the reception circuit 20 in the subsequent stage via the communication path 3 of the fastest cycle used for transmission and the cycle for the error correction/detection unit 21 to receive data. Next, in ST3, the transmission data generation unit 12 generates data for a plurality of reception-side units as a plurality of slave communication devices, which are connected to one header in a daisy chain, including the reception-side unit 2.

Next, in ST4, the ECC attachment unit 13 attaches the error correction code ECC for an error correction to the transmission data generated by the transmission data generation unit 12. Next, the process proceeds to ST5 such that the selection unit 15 as a transmission unit that transmits data starts the transfer of first transmission data associated with a time of 0 to 50 μs.

It is determined in ST5 whether the transmission data transmitted by the selection unit 15 is transferred in the first cycle with respect to each of the slave communication devices as a transmission destination in the communication with each of the slave communication devices. Here, when it is determined that the selection unit 15 transmits the transmission data of the first cycle, the process proceeds to ST6, and the data in the data storage unit 14 is updated with the transmission data. Next, in ST7, the selection unit 15 concatenates the transmission data as one piece of transmission data to be transmitted, and the process returns to ST3.

On the other hand, when it is determined in ST5 that the selection unit 15 does not transmit the transmission data of the first cycle, the process proceeds to ST8, the selection unit 15 concatenates the data stored in the data storage unit 14 as one piece of transmission data to be transmitted, and the process returns to ST3.

The selection unit 15 transmits the concatenated transmission data to the reception circuit 20 in the subsequent stage via the communication path 3 after the selection of transmission data to all of the slave communication devices is completed. As a result, the selection unit 15 as the transmission unit transmits the transmission data, in which a plurality of pieces of data and a plurality of error correction codes ECC are attached to one header, four times in total at a cycle of 50 μs, but transmits, as contents of the transmission data, the same transmission data to each of the slave communication devices twice, four times, and once.

[Data Communication Processing of Reception-Side Unit 2]

Figure 3:
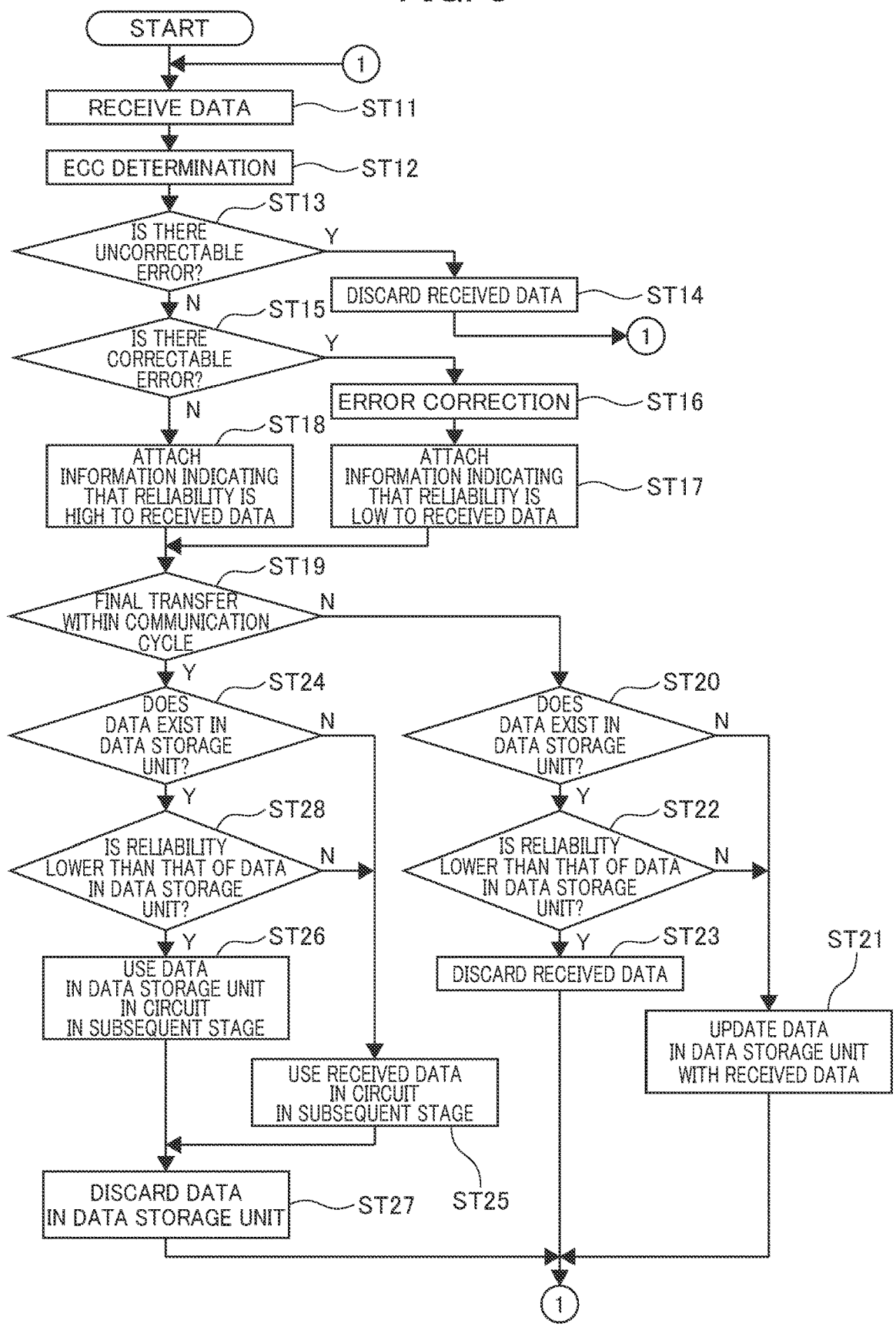
FIG. 3 is a flowchart illustrating data communication processing of the communication system showing the present embodiment.

FIG. 3 is a flowchart illustrating data communication processing of the communication system showing the present embodiment. ST11 to ST28 indicate respective Steps, and each of Steps is realized in a manner that a CPU (not shown) constituting the reception circuit 20 of the reception-side unit 2 loads a control program stored in a ROM or the like on a RAM and executes the control program. Further, this data communication processing may be configured as a slave communication device in which this processing by the software shown in the present embodiment is realized by a hardware circuit.

In ST11, the error correction/detection unit 21 of the reception circuit 20 receives the data transmitted from the transmission-side unit 1 in the upper stage via the communication path 3. Next, in ST12, the error correction/detection unit 21 starts a process of determining, based on the error correction code ECC attached to the received data, whether the data has been received normally, whether the data can be corrected to correct data when the data has not been received normally, or whether the data received by being determined to be uncorrectable is discarded.

Next, the error correction/detection unit 21 determines in ST13 whether there is an error (information indicating whether an error can be corrected) that cannot be corrected by the error correction code ECC attached to the data. Here, when it is determined that there is an error that cannot be corrected by the error correction code ECC attached to the received data, the process proceeds to ST14, the CPU (not shown) of the reception circuit 20 discards the received data, and the process returns to ST11.

On the other hand, when the error correction/detection unit 21 determines in ST13 that there is no error that cannot be corrected by the error correction code ECC attached to the received data, the error correction/detection unit 21 determines in ST15 whether there is an error that can be corrected by the error correction code ECC attached to the received data.

Here, when the error correction/detection unit 21 determines that there is an error that can be corrected by the error correction code ECC, the process proceeds to ST16, and the error correction/detection unit 21 corrects the error of the received data based on the error correction code ECC. Next, in ST17, the error correction/detection unit 21 attaches information indicating that the reliability is low to the received data and causes the data storage unit 22 to store it, and the process proceeds to ST19.

On the other hand, when the error correction/detection unit 21 determines in ST15 that there is no error that can be corrected by the error correction code ECC attached to the received data, the process proceeds to ST18, the error correction/detection unit 21 attaches information indicating that the reliability is high to the received data and causes the data storage unit 22 to store it, and the process proceeds to ST19. In this case, the data storage unit 22 stores the data itself that has been received normally.

The error correction/detection unit 21 determines in ST19 whether the data to be received next is the final transfer (fourth cycle) within the communication cycle, and the process proceeds to ST20 when it is determined that the data is not the final transfer.

Next, the error correction/detection unit 21 determines in ST20 whether data exists in the data storage unit 22. Here, when the error correction/detection unit 21 determines that data does not exist in the data storage unit 22, the process proceeds to ST21, the error correction/detection unit 21 updates the data in the data storage unit 22 with the received data, and the process returns to ST11.

On the other hand, when the error correction/detection unit 21 determines in ST20 that the data exists in the data storage unit 22, the process proceeds to ST22, and the reliability comparison unit 24 determines whether the reliability of the received data is lower than the reliability of the data stored in the data storage unit 22. Here, when the reliability comparison unit 24 determines that the reliability of the received data is lower than the reliability of the data stored in the data storage unit 22, the CPU (not shown) of the reception circuit 20 discards the data received this time (ST23), and the process returns to ST11.

On the other hand, when the reliability comparison unit 24 determines in ST22 that the reliability of the received data is higher than the reliability of the data stored in the data storage unit 22, the process proceeds to ST21, the error correction/detection unit 21 updates the data in the data storage unit 22 with the received data, and the process returns to ST11.

On the other hand, when the error correction/detection unit 21 determines in ST19 that the next received data is the final transfer within the communication cycle, the process proceeds to ST24.

The error correction/detection unit 21 determines in ST24 whether data exists in the data storage unit 22, and when it is determined that the data does not exist in the data storage unit 22, the process proceeds to ST25, the selection unit 23 selects the data received this time to use in the data usage unit 25 which is a circuit in the subsequent stage, and the process proceeds to ST27.

On the other hand, when the error correction/detection unit 21 determines in ST24 that the data exists in the data storage unit 22, the process proceeds to ST28, and the reliability comparison unit 24 determines whether the reliability of the received data is lower than the reliability of the data stored in the data storage unit 22. Here, when the reliability comparison unit 24 determines that the reliability of the received data is higher than the reliability of the data stored in the data storage unit 22 (determined to be NO), the process proceeds to ST25, the selection unit 23 selects the data received this time to use in the data usage unit 25 which is a circuit in the subsequent stage, and the process proceeds to ST27.

On the other hand, when the reliability comparison unit 24 determines in ST28 that the reliability of the received data is lower than the reliability of the data stored in the data storage unit 22 (determined to be YES), the process proceeds to ST26, the selection unit 23 selects the data stored in the data storage unit 22 to use in the data usage unit 25 which is a circuit in the subsequent stage, and the process proceeds to ST27.

Next, in ST27, the CPU (not shown) of the reception circuit 20 discards the data stored in the data storage unit 22, and the process returns to ST11.

Thus, when the data having high reliability is received at a timing other than the originally receiving timing (when the slave communication device is normally receiving the data), the previously received data can be utilized even when the data cannot be normally received at the originally receiving timing.

Similarly, when the data having slightly low reliability is received at a timing other than the originally receiving timing (when the received data can be corrected to the data, which should be originally received, using an ECC), the previously received data can be utilized even when the data cannot be normally received at the originally receiving timing.

Figure 4:
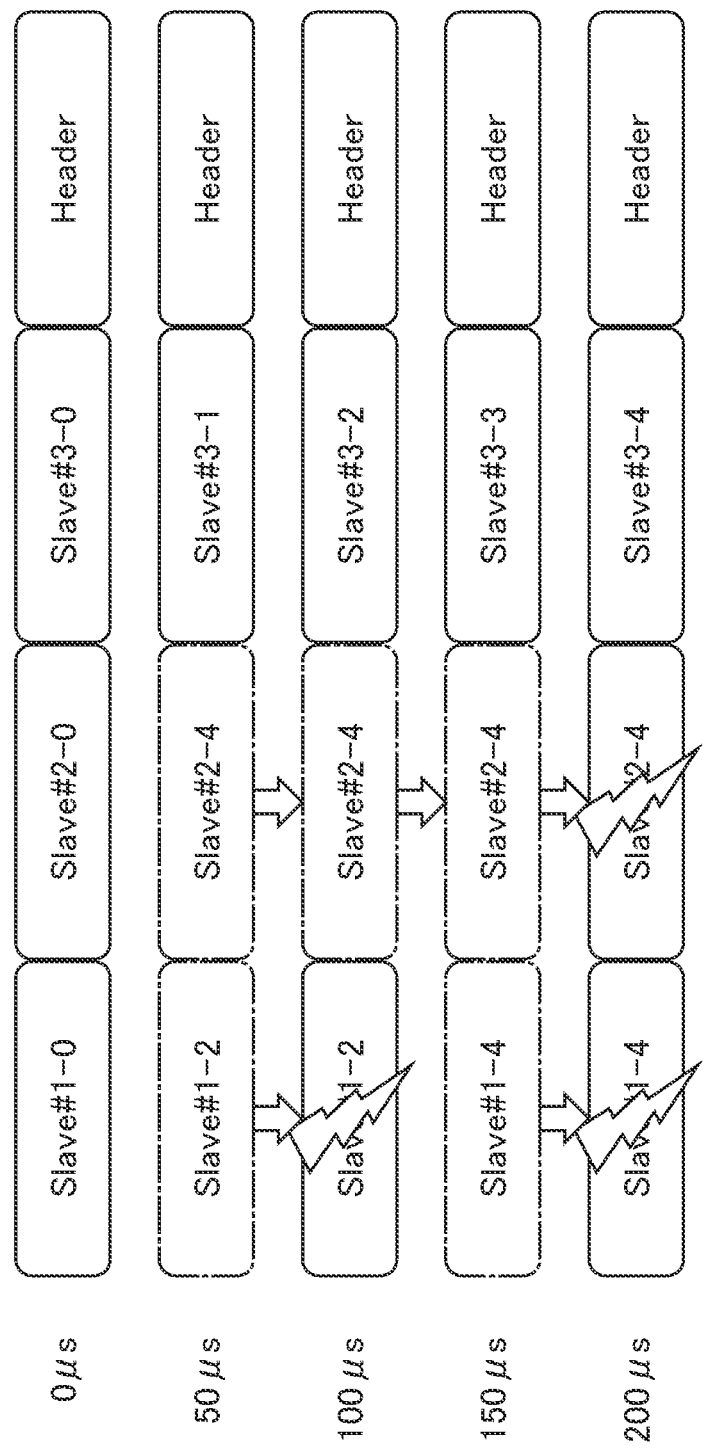
FIG. 4 is a diagram illustrating a state of received data in the communication system showing the present embodiment.
Figure 5:
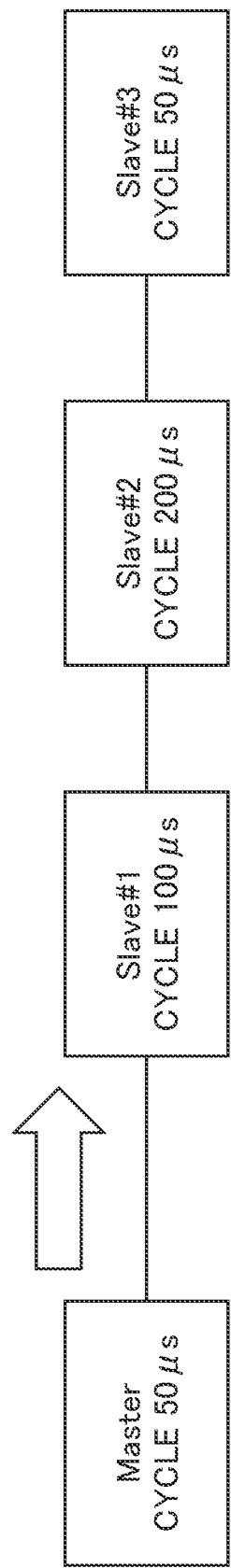
FIG. 5 is a block diagram illustrating data transmission/reception processing of a conventional communication system.
Figure 6:
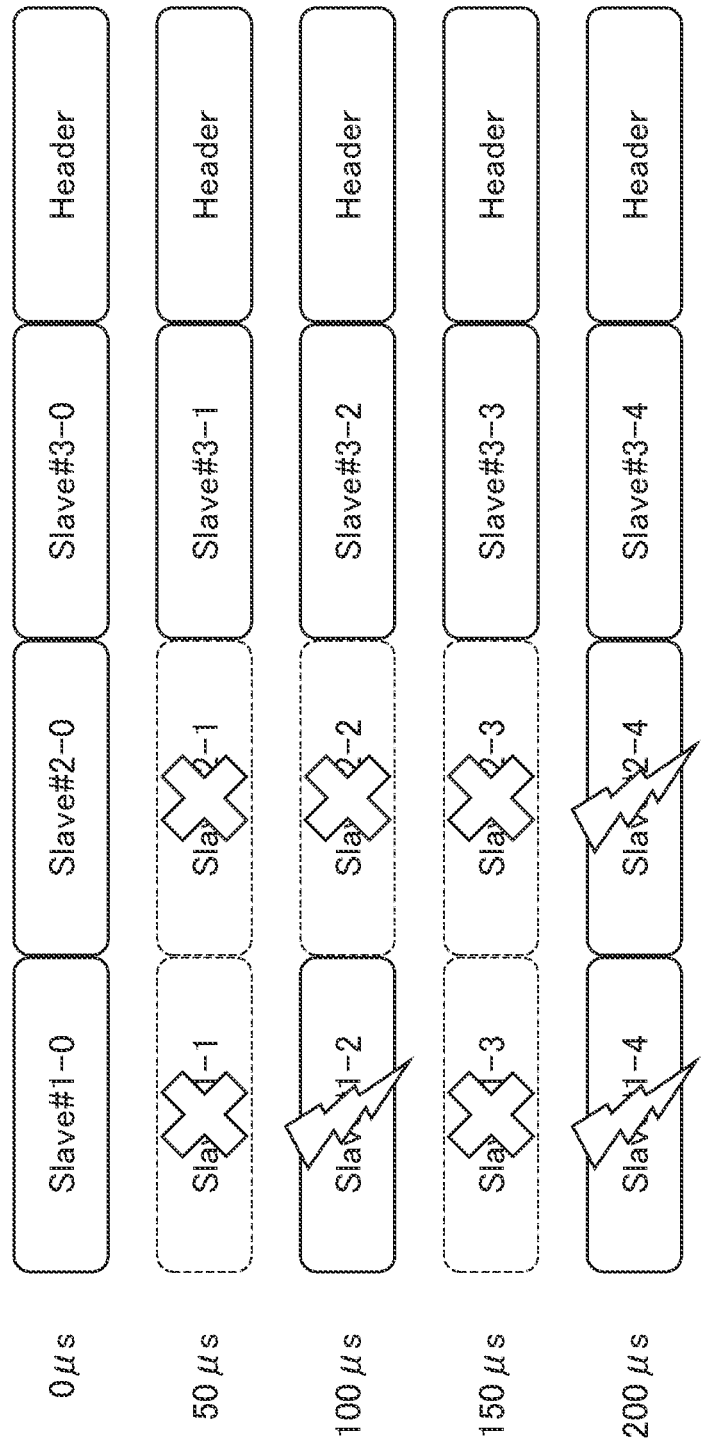
FIG. 6 is a diagram showing a state of received data in the communication system.

FIG. 4 is a diagram illustrating a state of received data of the communication system showing the present embodiment, and the same reference numerals are given to the same as those in FIG. 6.

Each of the slave communication devices 2 compares correction detection results based on the ECC attached to the data sequentially received from the master communication device 1, and stores the data having high reliability in the data storage unit 22. Further, for the sake of description, the plurality of slave communication devices 2 are referred to as a slave communication device (Slave #1), a slave communication device (Slave #2), and a slave communication device (Slave #3).

In FIG. 4, when the time has elapsed from 0 to 50 μs, all of the slave communication device (Slave #1), the slave communication device (Slave #2), and the slave communication device (Slave #3) have normally received the data, and thus the data storage units 22 of the slave communication device (Slave #1), the slave communication device (Slave #2), and the slave communication device (Slave #3) are in a state of storing the data which has been normally received.

Next, when the time has elapsed from 50 to 100 μs, since the slave communication device (Slave #1) corresponds to a timing of receiving data, when an error occurs in which data is received but cannot be repaired, the received data will be discarded. However, in the present embodiment, the slave communication device (Slave #1) can select and use the data stored in the data storage unit 22 at the time point when the time has elapsed from 0 to 50 μs.

On the other hand, the slave communication device (Slave #2) normally receives the data, but has the cycle of 200 μs, and thus the contents of the data storage unit 22 are updated with the data received at the time point when the time has elapsed from 0 to 50 μs.

On the other hand, the slave communication device (Slave #3) normally receives the data and has the cycle of 50 μs, and thus the contents of the data storage unit 22 are updated with the data received this time.

Then, when the time has elapsed from 100 to 150 μs, all of the slave communication device (Slave #1), the slave communication device (Slave #2), and the slave communication device (Slave #3) normally receive the data; however, although it is not a timing for the slave communication device (Slave #1) and the slave communication device (Slave #2) to receive the data, the slave communication device (Slave #1) updates the contents of the data storage unit 22 with the data received this time, and the slave communication device (Slave #2) updates the contents of the data storage unit 22.

On the other hand, the slave communication device (Slave #3) normally receives the data and has the cycle of 50 μs, and thus the contents of the data storage unit 22 are updated with the data received this time.

Then, when the time corresponding to the fourth cycle has elapsed from 150 to 200 μs, the slave communication device (Slave #1) selects the data normally received at the third cycle and stored in the data storage unit 22 when each of the slave communication device (Slave #1) and the slave communication device (Slave #2) corresponds to a timing of receiving data and an error occurs in which the received data cannot be repaired.

On the other hand, the slave communication device (Slave #2) selects and uses the data stored in the data storage unit 22 while being sequentially updated from the time point when 50 μs has elapsed.

On the other hand, since the data received this time is normal data, the slave communication device (Slave #3) selects and uses the received data.

In this way, the data received by the slave communication device (Slave #1), the slave communication device (Slave #2), and the slave communication device (Slave #3) during the four cycles of data transmission can be efficiently utilized without discarding wastefully the normally received data even when an error (bit error) occurs associated with the data transmission.

Effect of First Embodiment

According to the present embodiment, it is possible to perform data communication that efficiently utilizes the data received normally or in a correctable manner at the timing different from the timing at which each of the slave communication devices should receive the data.

Second Embodiment

In the above embodiment, an example has been described in which the error correction code ECC is attached to the transmission data, as the information indicating the reliability. However, in a case where only the error detection needs be performed, a CRC or a checksum may be used as the error detection code of the received data. When the CRC is used as the error detection code, the information indicating the reliability is in two levels.

Effect of Second Embodiment

According to the present embodiment, it is possible to use error check processing adapted to the reliability required for the data used in the communication system.

In the above embodiment, the case of constituting as the communication system has been disclosed, but the slave communication device on the reception side and the master communication device on the transmission side constituting the system may be configured as independent embodiments. Further, the communication system may be configured as a communication system including a master communication device and a slave communication device in which this processing by the software shown in FIGS. 2 and 3 of the above embodiment is realized by a hardware circuit.

Further, as described above, the communication system shown in the present embodiment can also be applied to a communication system in which a controller and a machine tool communicate with each other.

In addition, the present disclosure is not limited to the above embodiments, and the present disclosure can be changed and improved within the scope in which the object of the present disclosure can be achieved.

EXPLANATION OF REFERENCE NUMERALS

1: Transmission-side unit (Master communication device)
2: Reception-side unit (Slave communication device)
12: Transmission data generation unit (Generation unit)
15: Selection unit (Transmission unit)
16 calculation unit
21: Error correction/detection unit (Determination unit)
22: Data storage unit (Storage unit)
23: Selection unit
24: Reliability comparison unit (Comparison unit)

The invention claimed is:

1. A communication system in which a plurality of slave communication devices are connected in a daisy chain to a master communication device,
the master communication device including:
a generation unit that generates transmission data including one header and consecutive data for all slave communication devices, the consecutive data following the one header; and
a transmission unit that transmits the transmission data generated by the generation unit at a fastest cycle among communication cycles requested by the plurality of slave communication devices,
the plurality of slave communication devices including:
a storage unit that attaches information indicating reliability to data received from the master communication device and stores the same;
a comparison unit that compares reliability of data received later with the reliability of the data stored in the storage unit; and
a selection unit that selects the data stored in the storage unit in a case where the reliability of the data stored in the storage unit is higher than the reliability of the data received later by the comparison unit.

2. The communication system according to claim 1, wherein the master communication device includes
a calculation unit that calculates the fastest communication cycle for the transmission data and the number of times of transmission of the transmission data, from the fastest communication cycle and the communication cycles of the plurality of slave communication devices.

3. The communication system according to claim 1, wherein the transmission unit repeatedly transmits, at the fastest cycle, the same transmission data to any of the slave communication devices, which receives the transmission data at a cycle longer than the fastest cycle.

4. The communication system according to claim 1, wherein the plurality of slave communication devices include a determination unit that detects a transfer error of the data and determines whether the error is correctable, and the determination unit attaches information indicating reliability based on the correctability to the data and causes the storage unit to store the information.

5. The communication system according to claim 1, wherein the transmission data is attached with an error correction code ECC or an error detection code CRC.

\* \* \* \* \*